United States Patent [19]

Sheldon

[11] 4,051,921

[45] Oct. 4, 1977

[54] GREASE PLUG

[75] Inventor: Jerome F. Sheldon, Milwaukee, Wis.

[73] Assignee: Rexnord Inc., Milwaukee, Wis.

[21] Appl. No.: 755,104

[22] Filed: Dec. 28, 1976

Related U.S. Application Data

[63] Continuation of Ser. No. 608,367, Aug. 27, 1975, abandoned.

[51] Int. Cl.$^2$ .............................................. F01M 1/06
[52] U.S. Cl. .................................. 184/1 D; 308/187
[58] Field of Search .............. 184/1 D, 105 R, 105 B; 308/187, 187.1; 24/73 P; 85/80, 81; 239/547, 550

[56] References Cited

U.S. PATENT DOCUMENTS

| | | | |
|---|---|---|---|
| 553,621 | 1/1896 | Kraus | 308/187 |
| 1,991,623 | 2/1935 | Onsrud | 308/187.1 |
| 2,424,757 | 7/1947 | Klumpp | 85/80 |
| 2,649,884 | 8/1953 | Westover | 85/80 |
| 2,705,055 | 3/1955 | Matuzas | 184/1 |
| 2,706,667 | 4/1955 | Kaczor | 308/121 |
| 2,716,574 | 8/1955 | Chase | 239/547 |
| 3,035,624 | 5/1962 | Jaworski | 85/80 |
| 3,213,745 | 10/1965 | Dwyer | 85/80 |
| 3,494,675 | 2/1970 | Hold | 308/20 |
| 3,797,755 | 3/1974 | Saisho | 239/547 |

*Primary Examiner*—David H. Brown
*Attorney, Agent, or Firm*—Sughrue, Rothwell, Mion, Zinn and Macpeak

[57] ABSTRACT

A grease plug adapted to fit into a cross hole in communication with a through-greasing passage and to reduce the effective cross-sectional area of the cross hole. The grease plug comprises (1) a generally cylindrical plug portion having at least one grease passage extending generally axially thereof and (2) a generally hook-shaped mounting portion which functions as a snap lock to retain the plug portion in the cross hole. In one embodiment, the mounting portion itself is long enough to bear against the inner surface of the through-greasing passage to prevent the grease plug from being lost therein; in another embodiment, a spacing portion is provided on the bottom of the mounting portion, and the spacing portion bears against the inner surface of the through-greasing passage. The grease passage can have various shapes.

26 Claims, 10 Drawing Figures

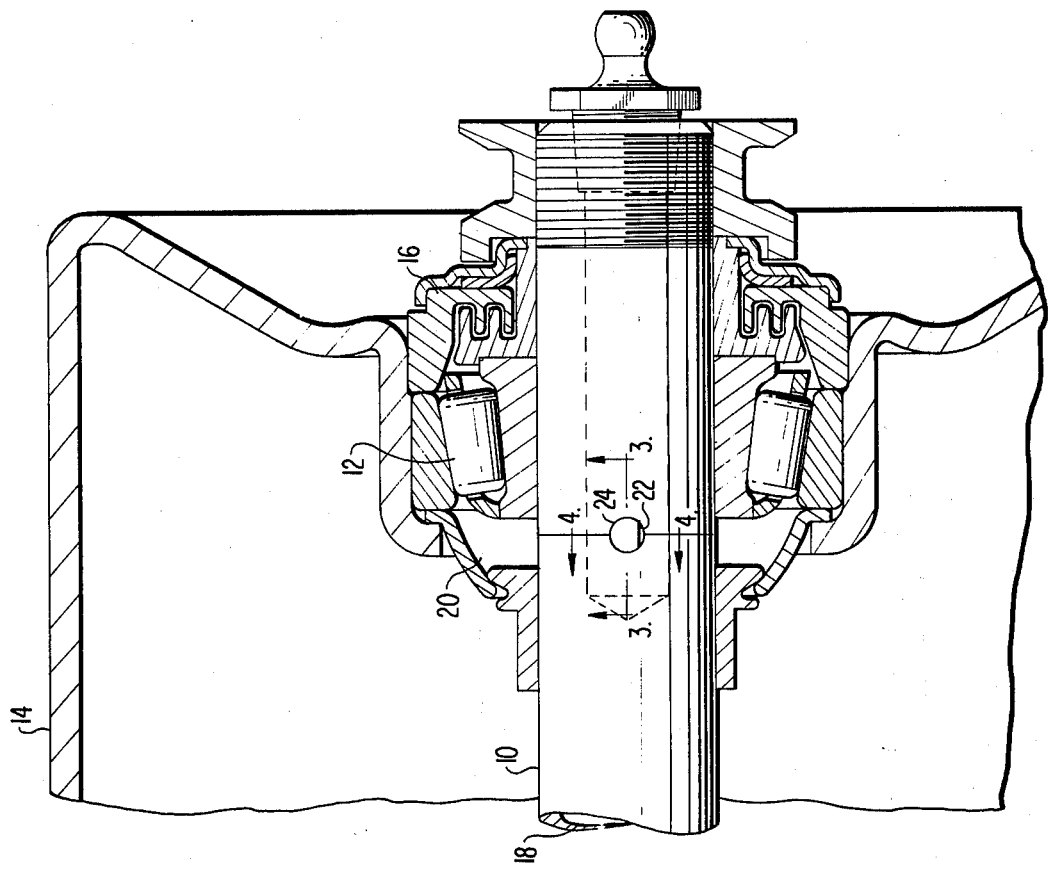
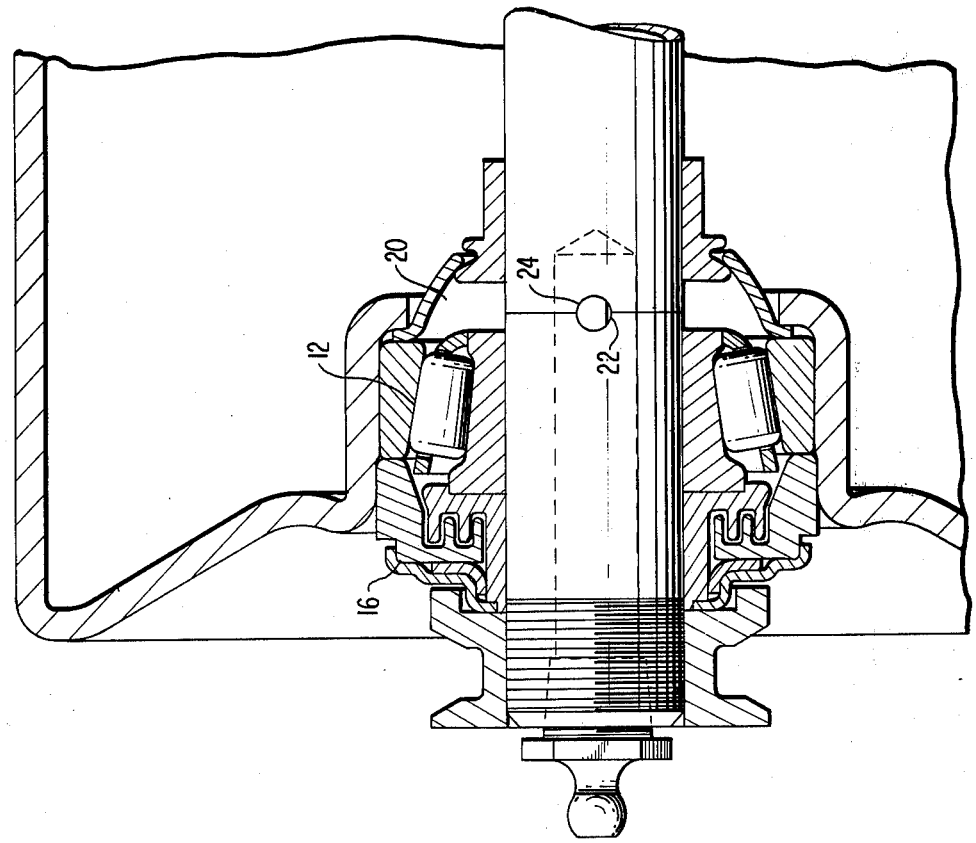
FIG.1

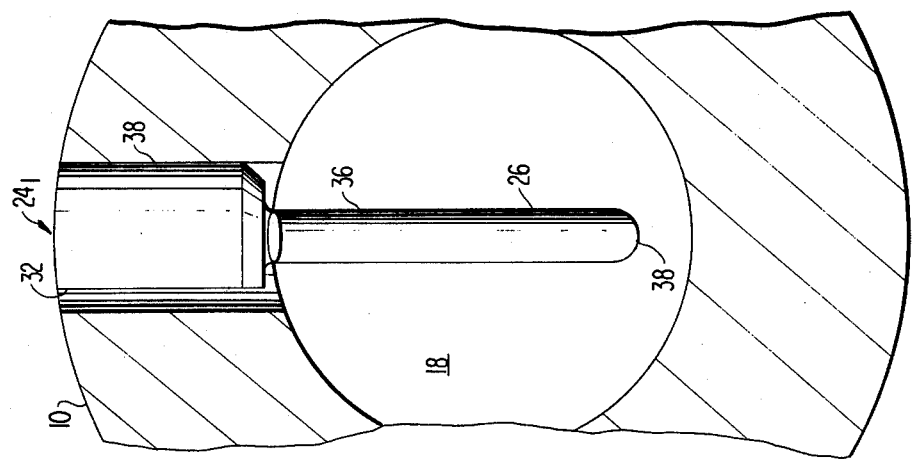
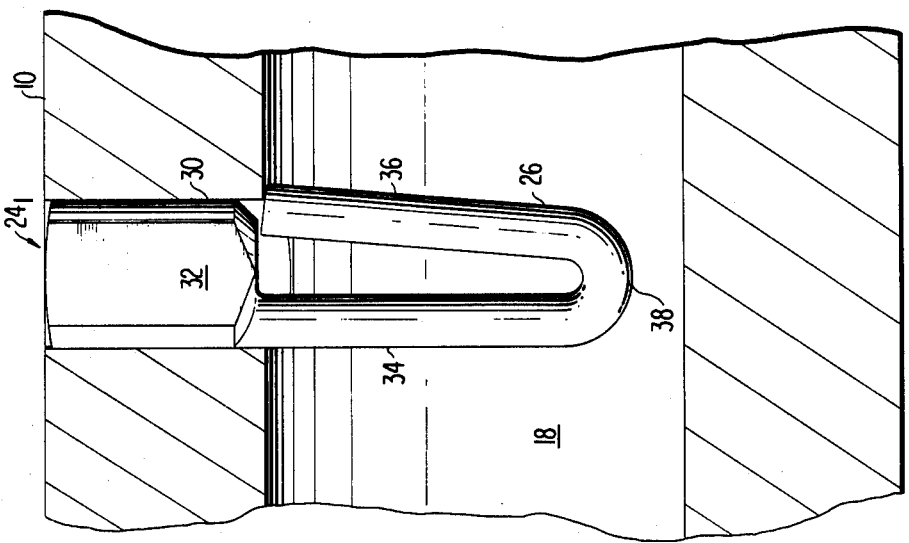
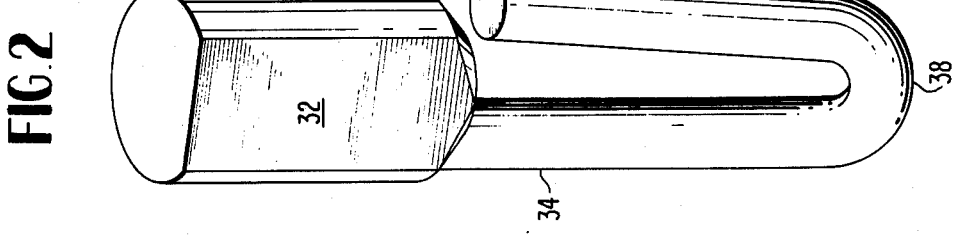

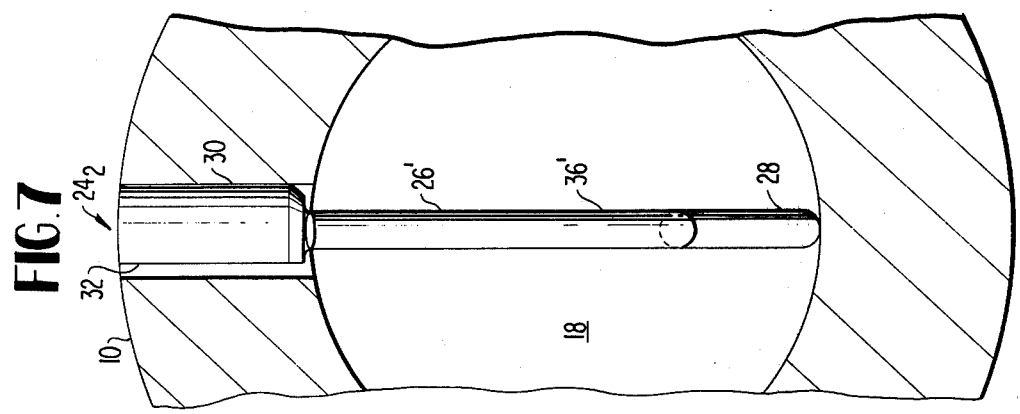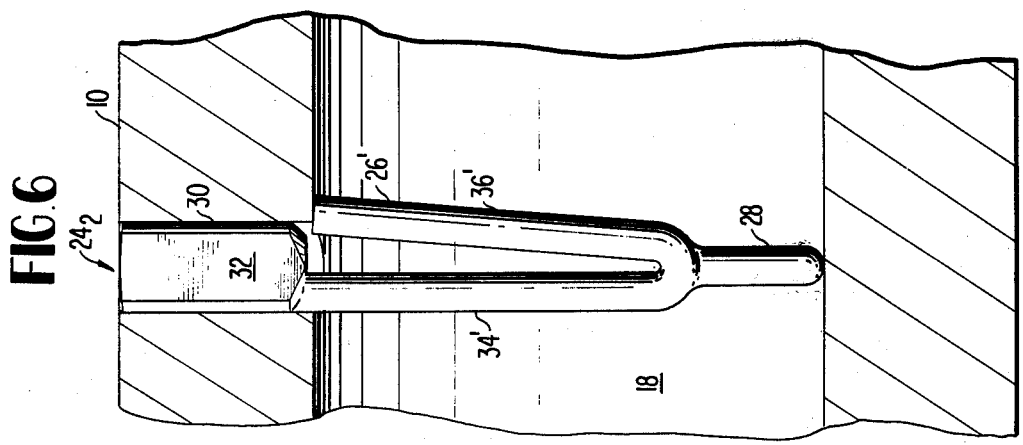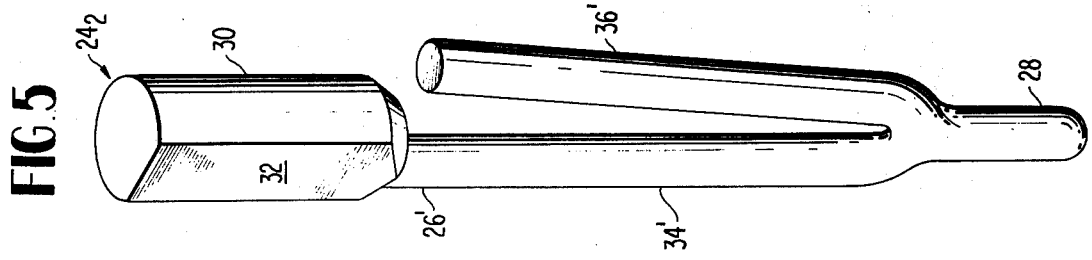

GREASE PLUG

This is a continuation, of application Ser. No. 608,367, filed Aug. 27, 1975 now abandoned.

FIELD OF THE INVENTION

This invention relates to grease plugs adapted to fit into a cross hole in communication with a through-greasing passage and to reduce the effective cross-sectional area of the cross hole. It is particularly, through not exclusively, adapted for use with bearing seal assemblies on idler rollers.

SUMMARY OF THE INVENTION

The subject grease plug comprises (1) generally cylindrical plug portion having at least one grease passage extending generally axially thereof and (2) a generally hook-shaped mounting portion which functions as a snap lock to retain the plug portion in the cross hole. In one embodiment, the mounting portion itself is long enough to bear against the inner surface of the through-greasing passage to prevent the grease plug from being lost therein; in another embodiment, a spacing portion is provided on the bottom of the mounting portion, and the spacing portion bears against the inner surface of the through greasing passage. The grease passage can have various shapes.

BRIEF DESCRIPTION OF THE DRAWINGS

FIG. 1 is a cross-sectional view of an idler roller assembly employing the subject invention.

FIG. 2 is a perspective view of one embodiment of the subject invention.

FIG. 3 is a view along lines 3—3 in FIG. 1 of the embodiment shown in FIG. 2.

FIG. 4 is a view along lines 4—4 in FIG. 1 of the embodiment shown in FIG. 2.

FIG. 5 is a perspective view of a second embodiment of the subject invention.

FIG. 6 is a view along lines 3—3 in FIG. 1 of the embodiment shown in FIG. 5.

FIG. 7 is a view along lines 4—4 in FIG. 1 of the embodiment shown in FIG. 5.

DETAILED DESCRIPTION OF THE PREFERRED EMBODIMENTS

Figure 8:
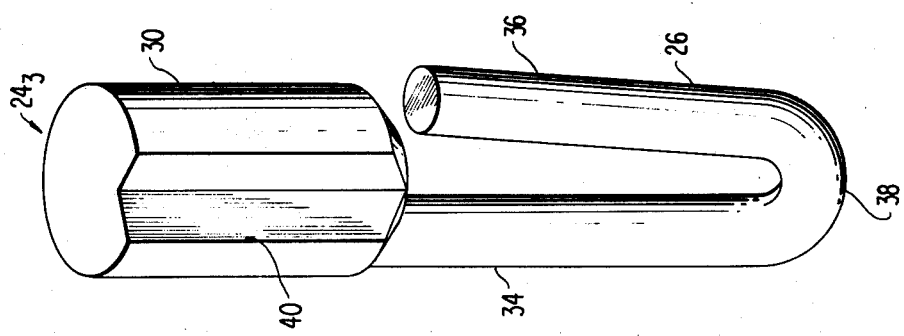
FIG. 8 is a perspective view of a third embodiment of the subject invention.

FIG. 1 shows an environment for which the subject invention is particularly suited. Shown therein is a shaft 10, rotary bearings 12 mounted on the shaft 10, an idler roll 14 journaled on the rotary bearings 12, and seal assemblies 16 protecting the rotary bearings 12 from external contaminants. A through-greasing passage 18 is provided for the passage of grease from a greasing station at one end of the idler roll 14, or a series of such rolls, to the other. Adjacent to each rotary bearing 12 is a bearing cavity 20 which must be periodically charged with fresh grease for the rotary bearings 12. To charge the bearing cavity 20, a cross hole 22 is provided, and the grease plug 24 which constitutes the present invention is shown mounted in the cross hole 22.

To successfully through-grease its idler roll assemblies having widths greater than 36 inches, the assignee of the subject invention has discovered that it must restrict the effective cross-sectional areas of the cross holes to develop sufficient back pressure to evenly grease each bearing cavity and to purge each seal assembly. However, it is difficult to produce a cross hole of sufficiently small diameter on a production basis. Accordingly, in the past it has produced a 0.125 inch diameter cross hole in the shaft and has reduced the effective cross-sectional area of the outer opening of the hole by fitting a plastic ring around the shaft in position to partially obstruct that opening. The plastic ring, however, has proved difficult to handle during automated roll assembly.

Shown in FIGS. 2, 5, and 8–10 are five embodiments of a grease plug ($24_1$ in FIG. 2; $24_2$ in FIG. 5, $24_3$ in FIG. 8, $24_4$ in FIG. 9, and $24_5$ in FIG. 9) which can be inserted in a cross hole having a 0.125 inch diameter, but which can easily be dimensioned to leave a much smaller effective cross-sectional area. These grease plugs will snap into position which ever way they are oriented in a cross hole, they will not back out into the bearing cavity because of the snap lock provided by the mounting portions 26 and 26', and they cannot be lost in the through-greasing passage because of the length of the mounting portion 26 (FIGS. 2 and 8–10) or the combined length of the mounting portion 26' and the spacing portion 28 (FIG. 5). The entire grease plug is preferably integrally molded from an oil- and grease-resistant plastic, and it can easily be inserted into each cross hole prior to automated roll assembly.

Each grease plug $24_1$–$24_5$ comprises a generally cylindrical plug portion 30 having a radius of size sufficient to cause the plug portion to fit snugly into the cross hole 22, and each grease plug $24_1$–$24_5$ has at least one grease passage extending generally axially of the plug portion along the outer perihery thereof. In applicant's presently preferred embodiment (shown in FIGS. 1 and 5), the grease passage is formed by a flattened side portion 32 defined by a plane lying parallel to the axis of the plug portion. The length of the imaginary line perpendicular to the flattened side portion 32 and intersecting the axis of the generally cylindrical side portion is such that the cross-sectional area of the volume defined by the flattened side portion 32 and the inner wall of the cross hole 22 is equal to the desired effective cross-sectional area of the cross hole.

Each grease plug $24_1$–$24_5$ also comprises the previously mentioned generally hook-shaped mounting portion 26 or 26'. (The FIGS. 8–10 embodiments are shown with mounting portions 26, but of course the mounting portions 26 could be replaced by mounting portions 26'.) The mounting portions 26 and 26' are integral with the plug portions 30 on the inner axial faces thereof, they are made of a resilient material, and they are dimensioned so that the mounting portions 26 and 26' can be readily pressed through the cross hole 22, but is prevented from working out of the cross hole 22 by the spacing between the legs 34, 36 and 34', 36' of the mounting portions 26 and 26', respectively. The legs 34, 36 and 34', 36' function as a snap lock to retain the plug portions 30 in the cross hole 22.

In the grease plugs $24_1$ and $24_3$–$24_5$, the mounting portion 26 is long enough in the direction of the axis of the plug portion 30 to bear against the inner surface of the through-greasing passage 18 while the plug portion 30 is lodged in the cross hole 22, thereby preventing the grease plug from being lost in the through-greasing passage 18. In the grease plug $24_2$, the previously mentioned spacing portion 28 is made integrally with the mounting portion 26' at the juncture 38' of the legs 34', 36' thereof. The spacing portion 28 extends from the mounting portion 26' on the side thereof opposite to the plug portion 30, and it is dimensioned so that the mounting portion 26' and the spacing portion 28 together are long enough in the direction of the axis of the plug portion 30 so that the spacing portion 28 bears against the inner surface of the through-greasing passage 18 while the plug portion 30 is lodged in the cross hole 22, thereby preventing the grease plug 24' from being lost in the through-greasing passage 18.

Figure 9:
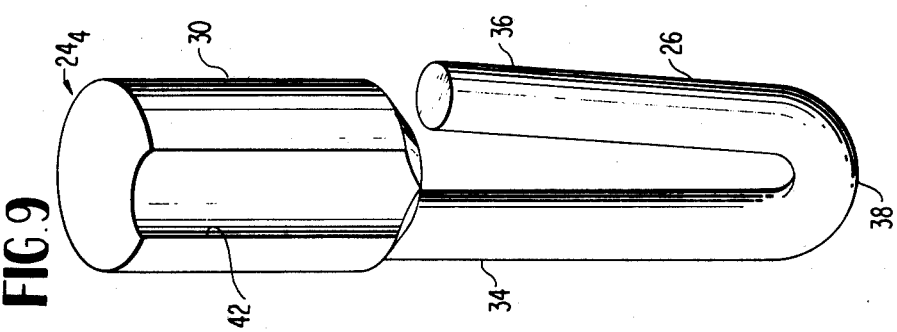
FIG. 9 is a perspective view of a fourth embodiment of the subject invention.
Figure 10:
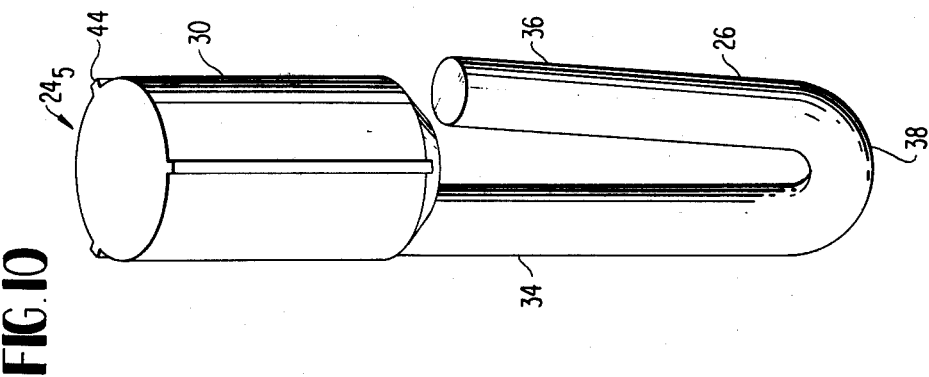
FIG. 10 is a perspective view of a fifth embodiment of the subject invention.

In the grease plugs 24₃-24₅, shown in FIGS. 8-10, respectively, the grease passage formed by the flattened side portion 32 is replaced by a grease passsage formed by a V-shaped groove 40 in FIG. 8, a semicircular groove 42 in FIG. 9, and by three grease passages defined by three axially extending lands or ridges 44 and the outer surface of the generally cylindrical plug portion 30. In each case, the total crosssectional area of the grease passage or passages is equal to the desired effective cross-sectional area of the cross hole. Of course, the three ridges 44 shown in FIG. 10 could be replaced by four or more ridges, and the grease passages need not be exactly axial, but can be, for instance, spiral - thereby somewhat increasing the back pressure on grease passing therethrough and permitting a smaller actual cross-sectional area to serve as a larger effective cross-sectional area.

CAVEAT

While the present invention has been illustrated by a detailed description of five preferred embodiments thereof, it will be obvious to those skilled in the art that various changes in form and detail can be made therein without departing from the true scope of the invention. For that reason, the invention must be measured by the claims appended hereto and not by the foregoing preferred embodiments.

What is claimed is:

1. The combination of a member having a through-greasing passage and a cross hole extending from the through-greasing passage to the surface of the member and a grease plug releasably mounted in the cross hole so as to reduce the effective cross-sectional area of the cross hole, said grease plug comprising:
   a. a generally cylindrical plug portion having
      i. a radius of size sufficient to cause said plug portion to fit snugly into the cross hole and
      ii. at least one grease passage extending generally axially of said plug portion along the outer periphery thereof so that said plug portion reduces the effective cross-sectional area of the cross hole while still forming a grease opening, the effective cross-sectional area of the grease passage or passages being equal to the desired cross-sectional area of the cross hole, and
   b. a generally hook-shaped mounting portion
      i. integral with said plug portion on one axial face thereof;
      ii. made of a resilient material, and
      iii. dimensioned so that the mounting portion can be readily pressed through the cross hole, but is prevented from working out of the cross hole by the spacing between the legs of the hook-shaped mounting portion.

2. A combination as recited in claim 1 wherein said grease plug is integrally molded from an oil- and grease-resistant plastic.

3. A combination as recited in claim 1 wherein said mounting portion is long enough in the direction of the axis of said plug portion to bear against the inner surface of the through-greasing passage while said plug portion is lodged in the cross hole, thereby preventing the grease plug from being lost in the through-greasing passage.

4. A combination as recited in claim 3 wherein said grease plug is integrally molded from an oil- and grease-resistant plastic.

5. A combination as recited in claim 1 wherein said grease plug further comprises a spacing portion
   a. integral with said mounting portion at the juncture of the two legs thereof,
   b. extending from said mounting portion on the side of said mounting portion opposite to said plug portion, and
   c. dimensioned so that said mounting portion and said spacing portion together are long enough in the direction of the axis of said plug portion so that said spacing portion bears against the inner surface of the through-greasing passage while said plug portion is lodged in the cross hole, thereby preventing the grease plug from being lost in the through-greasing passage.

6. A combination as recited in claim 5 wherein said grease plug is integrally molded from an oil- and grease-resistant plastic.

7. A combination as recited in claim 1 wherein at least one grease passage in said plug portion is defined by a plane lying parallel to the axis of said plug portion.

8. A combination as recited in claim 7 wherein said mounting portion is long enough in the direction of the axis of said plug portion to bear against the inner surface of the through-greasing passage while said plug portin is lodged in the cross hole, thereby preventing the grease plug from being lost in the through-greasing passage.

9. A combination as recited in claim 8 wherein said grease plug in integrally molded from an oil- and grease-resistant plastic.

10. A combination as recited in claim 7 wherein said grease plug further comprises a spacing portion
    a. integral with said mounting portion at the juncture of the two legs thereof,
    b. extending from said mounting portion on the side of said mounting portion opposite to said plug portion, and
    c. dimensioned so that said mounting portion and said spacing portion together are long enough in the direction of the axis of said plug portion so that said spacing portion bears against the inner surface of the through-greasing passage with which the cross hole communicates while said plug portion is lodged in the cross hole, thereby preventing the grease plug from being lost in the through-greasing passage.

11. A combination as recited in claim 10 wherein said grease plug is integrally molded from an oil- and grease-resistant plastic.

12. A combination as recited in claim 1 wherein at least one grease passage in said plug portion is defined by a V-shaped groove.

13. A combination as recited in claim 12 wherein said mounting portion is long enough in the direction of the axis of said plug portion to bear against the inner surface of the through-greasing passage while said plug portion is lodged in the cross hole, thereby preventing the grease plug from being lost in the through-greasing passage.

14. A combination as recited in claim 13 wherein said grease plug is integrally molded from an oil- and grease-resistant plastic.

15. A combination as recited in claim 12 wherein said grease plug further comprises a spacing portion
   a. integral with said mounting portion at the juncture of the two legs thereof,
   b. extending from said mounting portion on the side of said mounting portion opposite to said plug portion, and
   c. dimensioned so that said mounting portion and said spacing portion together are long enough in the direction of the axis of said plug portion so that said spacing portion bears against the inner surface of the through-greasing passage while said plug portion is lodged in the cross hole, thereby preventing the grease plug from being lost in the through-greasing passage.

16. A combination as recited in claim 15 wherein said grease plug is integrally molded from an oil- and grease-resistant plastic.

17. A combination as recited in claim 1 wherein at least one grease passage in said plug portion is defined by a semi-circular groove.

18. A combination as recited in claim 17 wherein said mounting portion is long enough in the direction of the axis of said plug portion to bear against the inner surface of the through-greasing passage while said plug portion is lodged in the cross hole, thereby preventing the grease plug from being lost in the through-greasing passage.

19. A combination as recited in claim 18 wherein said grease plug is integrally molded from an oil- and grease-resistant plastic.

20. A combination as recited in claim 17 wherein said grease plug further comprises a spacing portion
   a. integral with said mounting portion at the juncture of the two legs thereof,
   b. extending from said mounting portion on the side of said mounting portion opposite to said plug portion, and
   c. dimensioned so that said mounting portion and said spacing portion together are long enough in the direction of the axis of said plug portion so that said spacing portion bears against the inner surface of the through-greasing passage while said plug portion is lodged in the cross hole, thereby preventing the grease plug from being lost in the through-greasing passage.

21. A combination as recited in claim 20 wherein said grease plug is integrally molded from an oil- and grease-resistant plastic.

22. A combination as recited in claim 1 wherein at least one grease passage in said plug portion is defined by axially extending lands or ridges.

23. A combination as recited in claim 22 wherein said mounting portion is long enough in the direction of the axis of said plug portion to bear against the inner surface of the through-greasing passage while said plug portion is lodged in the cross hole, thereby preventing the grease plug from being lost in the through-greasing passage.

24. A combination as recited in claim 23 wherein said grease plug is integrally molded from an oil- and grease-resistant plastic.

25. A combination as recited in claim 22 wherein said grease plug further comprises spacing portion
   a. integral with said mounting portion at the juncture of the two legs thereof,
   b. extending from said mounting portion on the side of said mounting portion opposite to said plug portion, and
   c. dimensioned so that said mounting portion and said spacing portion together are long enough in the direction of the axis of said plug portion so that said spacing portion bears against the inner surface of the through-greasing passage while said plug portion is lodged in the cross hole, thereby preventing the grease plug from being lost in the through-greasing passage.

26. A combination as recited in claim 25 wherein said grease plug is integrally molded from an oil- and grease-resistant plastic.

* * * * *